July 23, 1968    E. E. HOWE    3,393,932
PIPE FITTING
Original Filed May 24, 1965
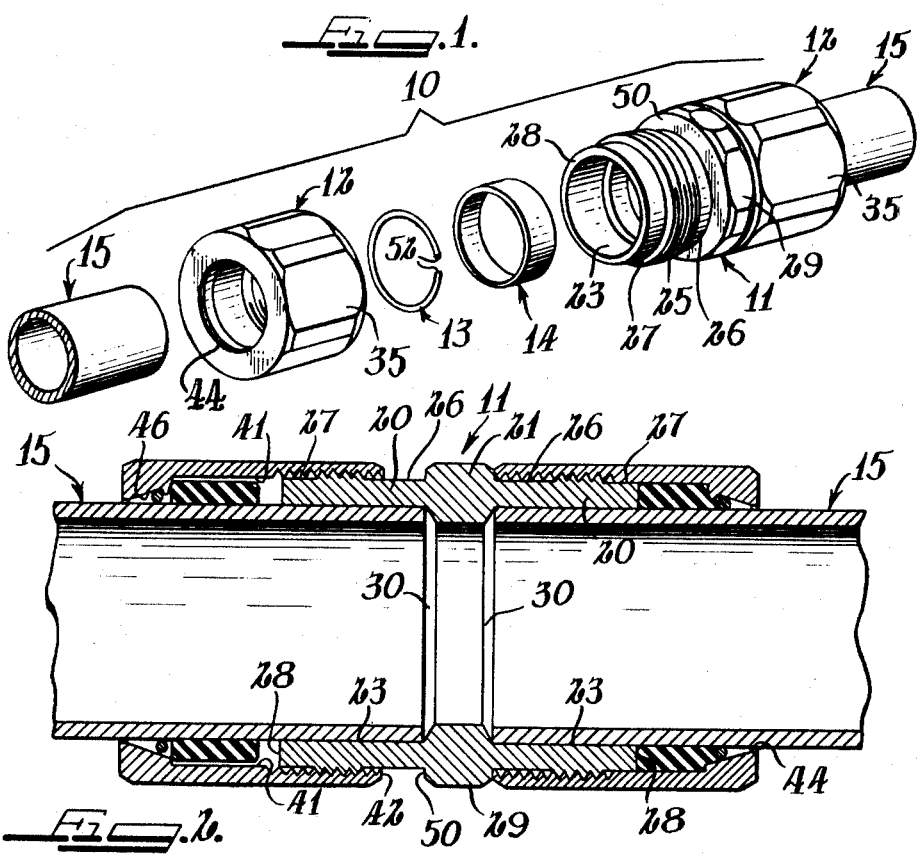
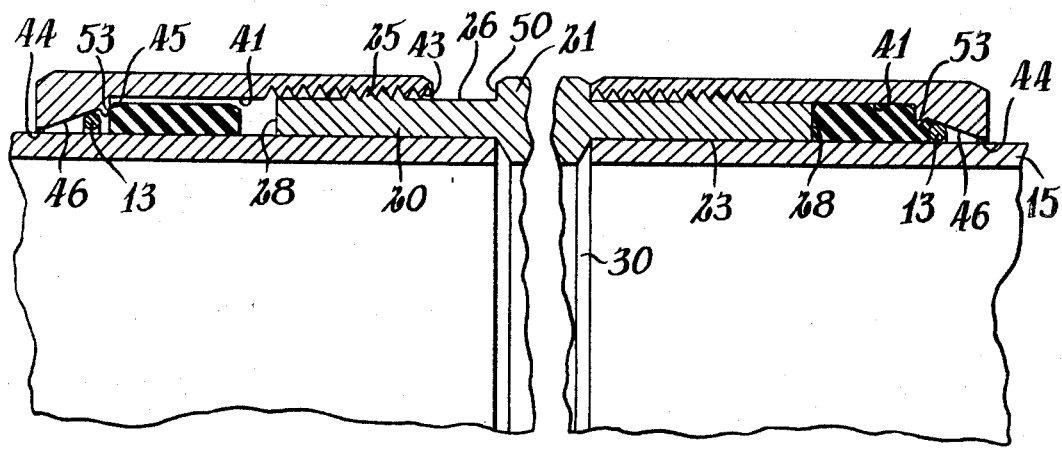
INVENTOR
EARL E. HOWE
BY
Horton, Davis, Brewer & Brugman
Attys.

United States Patent Office 3,393,932
Patented July 23, 1968

3,393,932
PIPE FITTING
Earl E. Howe, Chicago, Ill., assignor to Chicago Fittings Corporation, Broadview, Ill., a corporation of Delaware
Continuation of application Ser. No. 458,033, May 24, 1965. This application July 6, 1967, Ser. No. 651,632
1 Claim. (Cl. 285—369)

ABSTRACT OF THE DISCLOSURE

A four part pipe fitting assembly made up of a tubular male member having external threads for engagement with a female nut member, an annular elastic seal and a split metal locking ring, all coaxially receptive of smooth walled pipes and tubes in operating assembly. The assembled relationship of parts provides for threading advancement of the female nut over one end of the male member to a predetermined stop limit at which the seal is under predetermined compression within a smoothed wall annular chamber formed between one end of th male member and the interior of the female member. Such chamber communicates with the exterior of a tube mounted in the fitting and opens at one end into a chamfered portion presenting a camming surface against which the locking ring is maintained by suitable projections located between the chamfered portion and the chamber. Predetermined compression of the seal brings about fluid tight engagement thereof with the exterior of the pipe in the fitting and also causes cold flow extrusion of the seal in a single axial direction, appropriate to drive the locking ring along the camming surface and contract such into locking engagement with the exterior of the pipe, without deforming the latter.

---

This application is a continuation of Ser. No. 458,033, filed May 24, 1965, and now abandoned.

This invention relates generally to connective means for tubes and pipes and more particularly to fittings and couplings for effecting sealed connection of threadless or smooth walled pipes and tubes.

For many years there has existed a need of improved, simplified pipe fittings, particularly for use in household plumbing systems and the like whereby smooth walled tubes and pipes, may be interfitted quickly and joined without the necessity of laboriously threading the pipes and tubes for connection with conventional pipe fittings. Basically past efforts along this line have been brought about rather complicated fitting combinations of fittings having a number of loose parts, compression seals, locking devices and the like, which while generally effective to produce the desired connective function, nevertheless have failed to gain popular acceptance. It is believed that this recognized failure of previously known fittings for the aforemention purposes has come about largely from complexities of producing such prior fittings in mass quantities while maintaining proper operational effectiveness.

The present invention is directed to improved, simplified and unique combinations of elements for coupling and interconnecting smooth walled pipes and tubes, as exemplified by copper tubing of the type generally employed for carrying water in household plumbing systems and the like. The fitting assembly of this invention is constructed for "quick coupling" of smooth walled pipes while employing a minimum number of parts and avoiding the necessity of maintaining close tolerances in their manufacture and assembly. The present fitting combination also includes an annular seal member capable of effecting fluid-tight sealed junction with the external walls of the pipe or tube engaged thereby in operation and a simplified unitary locking means for effecting positive interlocking of the fitting parts and tube or pipe.

Summary of the invention

In brief the elemental combination of the present invention comprises a pair of threadingly interengageable male and female fitting members adapted to coaxially receive end portions of pipes or tubes to be coupled thereto; such fitting members forming an internal smooth walled annular chamber coaxially receptive of an elastomeric seal member and one of the fitting members including a lock activating camming surface means adjacent one end of the chamber for radially contracting a split metal locking ring means into locking engagement with the exterior of the pipe or tube in response to compression of the seal member and controlled axial extrusion thereof to drive the ring along the camming surface. The locking means utilized in the combination of this invention is further capable of being readily released for disassociating the tube and fitting as desired. Further the several parts of the fitting, as above-described, uniquely cooperate in a simplified manner to permit the user or operator to bring about the desired interlock between tube and fitting manually and without the necessity of any special tools; sealed interlocked condition between tube and fitting being finally brought about through the application of a specified torque and interthreaded advancement of one of the fitting members along the other to bring about predetermined compression of the seal member.

An important object of this invention is to provide a new and improved pipe fitting particularly useful for interconnecting smooth walled pipe and tubing.

Still another object of this invention is to provide improved pipe fittings having a minimum number of operating parts which are interactingly arranged in a simplified fashion to provide quick-acting couplings and fittings capable of positive sealed and locked interconnection with smooth walled pipes and tubes.

Another object of this invention is to provide a pipe fitting having improved means for effecting fluid-tight sealed interconnection with smooth walled pipes and tubes.

Another important object of this invention is to provide a pipe fitting of simplified construction without sacrifice of operational effectiveness and which is economical to manufacture.

Still another important object of this invention is to provide a new and improved pipe fitting for anchoring smooth walled pipe and tubes to stationary support means or intercoupling adjacent lengths of such pipes and tubes by means having a minimum number of operating parts organized in a unique fashion to permit a fluid-tight sealed and anchored connection with tubes or pipes by compressive means which are positively confined to effect the desired sealed and anchoring functions.

The above and further objects, features and advantages of this invention will appear from time to time from the following detailed description of a preferred embodiment of this invention as particularly illustrated in the accompanying drawings.

In the drawings:

FIGURE 1 is an exploded perspective view of a pipe fitting in the form of a coupling according to the present invention;

FIGURE 2 is an enlarged longitudinal cross-sectional view of the coupling illustrated in FIGURE 1 showing the same assembled between opposing ends of coaxially aligned pipe sections; the parts thereof being in sealed engagement with one of the tubes;

FIGURE 3 is a partial enlarged cross sectional view illustrating the condition and arrangement of the coupling elements seen in FIG. 2 prior to interlocking sealed connection thereof with a pipe; and FIGURE 4 is another partial enlarged cross sectional view, similar to FIG. 3, showing the fitting parts in sealed, locked engagement with the pipe.

Having thus described the present invention the best mode presently contemplated for enabling those skilled in the art to carry out and practice the same will now be set forth in conjunction with the particular embodiment thereof illustrated in the above-described drawings.

Turning to FIGURE 1 of the drawings, it will be recognized that the embodiment therein illustrated constitutes a pipe coupling or union for interjoining adjacent lengths of tubes or pipes. It will be understood, of course, that the concepts and teachings of the present invention are equally applicable to other styles of plumbing fittings for example, elbows, tees, adaptors, reducing couplers and the like.

With specific reference to FIGURE 1 the disassociated coupling assembly therein shown, indicated generally at numeral 10, comprises a coupling body 11 and a pair of internally threaded female nuts 12 adapted to coaxially receive male threaded end portions of the body 11. Cooperating with each of the nuts 12, is a lock ring 13 and a seal or gasket 14 which fit coaxially within the nuts 12 whereby two adjacent tube lengths 15—15 may be coaxially intercoupled, as will be described in greater detail presently.

The coupling body 11 is preferably formed as a machined metal member of generally cylindrical formation having oppositely extending cylindrical end portions 20—20 projecting coaxially outwardly of opposite ends of a central enlarged collar portion 21 which extends radially outwardly of the external cylindrical surface of the body member 11. Counterbores 23—23, coaxially aligned, are formed inwardly of the opposite ends of the end portions 20—20 so as to receive opposing end portions of the coaxially aligned tube members 15—15. In this respect the tubular members 15—15, illustrated may typically comprise seven-eighths inch copper tubing, conventionally for use in household plumbing systems, although the present invention is by no means limited to any particular size or diameter of the tubes or pipes.

Adjacent the outer end of each of the cylindrical end portions 20—20 and about the exterior thereof are male threads 25 which are formed substantially midway along the axial length of the cylindrical end portions 20 so that there is a smooth wall or cylindrical unthreaded portion 26 intermediate the thread members 25 and the central collar portions 21. There is a similar smooth cylindrical unthreaded portion 27 between the thread members 25 and the outer axial end 28 of each of the cylindrical end portions 20 of the coupling body; it being understood that the coupling body is formed symmetrically in the particular illustrated instance, about a central plane passing through the collar portion 21 thereof.

The collar portion 21 is further distinguished by a plurality of flat, or planar wrench engaging surfaces 29 on the exterior thereof, giving the same or polygonal external formation which typically may constitute a hexagonal form.

Internally, the body member 11, as noted previously, is formed at opposite ends with the coaxially aligned counterbores 23—23 each of which counterbores terminates in a stop shoulder 30 located radially inwardly of the external shoulder portion 21 of the body member. Shoulders 30, 30 comprise annular formations and effectively present stop means for limiting the axial insertion of the tubular members 15 into the counterbores 23, as illustrated particularly in FIGS. 2 and 3 of the drawings.

As shown best in FIGS. 2–4 the counterbores 23 are substantially equivalent to the external diameter of the tubes 15, being only slightly larger thereof to provide for the insertion of such tubular members and more particularly for the coaxial reception of the end portions of the tubular members which are disposed internally of the body member 11.

In the particular coupling assembly 10 shown, the body member 11 is adapted to threadingly cooperate with a pair of nut members 12, each of which is identical to the other, so that the description of one will suffice for both. As seen best in FIG. 1 of the drawings, each of the nut members 12 constitutes a substantially cylindrical or annular member having external wrench engaging surfaces 35 about its external periphery; such surfaces 35 corresponding to the flats or surfaces 29 formed on the central shoulder of the body member 11, to provide convenient means for manual or wrench engagement of the nut members to effectuate the relative rotation thereof about the body member 11.

As seen best from FIGS. 2–4 of the drawings, each nut member is formed with an internal counterbore having a smooth cylindrical portion 41 which is axially remote of a leading or forward one end 42 of the nut member. Extending between the annular cylindrical surface 41 of the counterbore and the nut end 42 is a female threaded portion 43, which has a greater axial extent than the male threads with which it cooperates, and which are formed at 25 on a cylindrical end portion 20 of the body member, as above described.

At the axially innermost end of the cylindrical counterbore 41, which counterbore is of greater diameter than the tube member 15, is a central opening 44 through which the tube member may be introduced for coaxial reception internally of the nut member 12. Formed to extend between such opening 44 and a bottom wall 45 of the counterbore is an angularly inclined or chamfered surface 46 which diverges radially outwardly from opening 44 toward the diametrical limits of the counterbore portion 41. The chamfered surface 46 constitutes a camming means for radially actuating the locking ring 13, while the annular seal member 14 is disposed adjacent ring 13 about the exterior of tube 15 and within an annular chamber formed by the cylindrical counterbore portion 41 of the nut member 12 and the end face or wall 28 of the body members portion 20 over which the nut member 12 is threadingly mounted. This latter relationship is best shown in FIGS. 3 and 4.

It is to be noted that the inner end 42 of the nut member is adapted to abuttingly engage a shouldered side wall portion 50 of the central collar 21 formed on the coupling body. This arrangement provides a simple limit stop upon the abutting engagement of such end portion 42 and side wall portion 50 when the nut 12 is fully turned up, to effect a maximum compression of the internal chamber formed between the nut's internal cylindrical wall portion 41 and the exterior surface of the pipe or tube 15 therewithin, as above described.

The locking ring 13, as illustrated particularly in FIG. 1 of the drawings, constitutes a solid metal ring which is broken about its circumference so as to provide opposing ends 52, 52 which are normally separated in the unlocked condition of the ring 13. Ring 13, as above indicated, is adapted to reside radially inwardly of the chamfered camming surface 46 of the nut member 12. Ring 13 is held against axial displacement into the chamber formed by the internal counterbore of the nut 12 by means of a plurality of circumferentially spaced staked or upset portions 53, formed substantially at the intersecting junction between the chamfered surface 46 and the bottom wall 45 of the counterbore. This is best accomplished after the ring 13 is assembled in its associated nut member within the circumferential confines of surface 46 thereof. In this latter respect, it will be appreciated that in its normal condition, or that is, in its unlocked condition, the ring 13 is of sufficient internal diameter to loosely reside adjacent the chamfered surface 46 of the nut member and to axially receive the external diameter of the tube 15 therethrough so that the tube 15 readily may be inserted into the fitting of this invention.

It will further be understood that the means for locking the ring 13 alongside the chamfered surface 46 may comprise a continuous annular bead as opposed to the circumferentially spaced staked or upset portions above described and illustrated; it being only necessary that the ring 13 be maintained axially beyond the counterbore chamber of the nut and in assembled association with the nut so as to prevent its loss in handling.

The elastomeric seal ring or gasket 14, as noted is also assembled internally of the nut 12; there being one such elastomeric seal in each of the nuts 12 and within the annular chamber provided by the smooth walled cylindrical portion 41 of the nut member, as best illustrated in FIGS. 2–4 of the drawings. It will be understood by those of skill in this art that in normal uncompressed state each of the seals 14 constitutes an annular elastic member having a greater axial length than radial extent or wall thickness. Further the seals, as shown, each have an internal bore diameter which readily receives the axial insertion of a tube member 15 therethrough. It will also be noted that in normal assembly, the seal ring 14 is disposed and maintained intermediate the end wall 28 of the body member 11, and the bottom wall 45 of the nut's counterbore in which position the pipe or tube end passes coaxially therethrough.

Having thus described the elemental portions of the improved pipe fitting of the present invention, as the same appears in the coupling embodiment illustrated, its use and operation will now be described:

In brief, in order to ready the coupling assembly 10 for acceptance of the two axially opposed tube members 15, the two nut members 12—12 thereof each carrying its respectively associated locking ring 13 and its seal ring 14 in the manner above set forth, are threadingly engaged with the male threads 25 of the coupling body member in the manner illustrated in the left hand side of FIG. 2 and in FIG. 3. In this state each nut 12 is only partialy threaded on to the threads 25. So conditioned the elastomeric seal element loosely resides radially within the annular chamber formed between the nut counterbore wall 41, end wall 45 thereof and end portion 28 of the fitting body. Thus a tube member 15 may be readily inserted axially through the nut opening 44 and against stop shoulder 30 in the fitting, ready for positive innerlocking and sealed connection therewith.

In order to effect the desired locking and sealed connection of the tubes with the coupling assembly 10, having loosely interassembled the same with the coupling as illustrated in FIG. 3, the nut members 12 are threadingly advanced toward the medial collar portion 21 of the coupling body so as to effect compression of the elastic seal 14, and radial locking contraction of ring 13. The ultimate threading advancement of the nut members onto the body member 11 is achieved when the end walls 42 of each of the nut members abuttingly engages the side wall portions 50 of the collar 21 on the coupling body; this serving as a stop limit for regulating the torque applied to the nut member at a given predetermined value. In this condition, as best illustrated in FIG. 4 of the drawings, it will be recognized that each of the elastomeric seals 14 is axially compressed and radially deformed to completely fill annular chambers about that portion of the tube 15 within the fitting. Specifically the seal is tightly pressed into sealing engagement with the cylindrical bore surfaces 41, the bore end wall 45, the end wall 28 of the fitting body, the external surface of the tube 15 and the locking ring 13, the latter acting to prevent extrusion of the seal past opening 44, as best shown in FIG. 4.

Upon such compression of the seal member 14 the latter serves to axially drive the locking ring 13 along the surface 46, causing the ring to radially contract in response to the reduction in diameter of surface 46 engaged by the ring 13 as the latter moves axially toward opening 44. Consequently the normally separated end portions 52, 52 of the spring like ring 13 are eventually brought into abutting engagement whereupon the ring is in its fully locked condition. In its locked state the ring positively grips the exterior surface of the tube 15 and tightly anchors the same within and to the coupling, preventing its axial withdrawal.

At the same time the compressive deformation of the seal ring 14 causes the latter to produce the desired liquid or fluid tight seal between the exterior surface of tube 15 and seal 14 thereby preventing loss of pressurized fluid from the interior of the tubing 15 through the fitting. It will be noted in this respect that a liquid tight seal is also effected between the end surface 28 of the fitting body and the seal member 14.

In operation, the above-described fitting arrangement is extremely effective in achieving the desired positive anchoring and sealing connection with tubular members. One of the marked advantages presented by the fitting of this invention resides in its ability to tightly grip and lock the tube members without the necessity of fully torquing the nut members 12 into their limit positions. That is to say the operator may move the nut members by hand in an advancing direction sufficiently to bring about a positive lock of the rings 13 with the exterior of the tube 15. This locking, though not sufficient to provide a sealed interconnection of fitting and pipe is nevertheless sufficient to hold the pipe or tube to the fitting without the need of employing a wrench. Thus the user may readily plumb and interconnect a plumbing circuit, for example a household water system, without resort to any other tools than his hands and means for cutting the tubular members 15 to desired lengths. This permits him to readily associate the couplings, fittings and tubes, and quickly assemble his piping system. Thereafter in order to assure positive seal between the tubes and the couplings it is preferable that each of the nut elements 12 be torqued to their fully engaged or limit positions. This operation is best accomplished by use of a wrench for engaging the surfaces 29 and 35 of the coupling body and nuts, respectively in a known manner.

It is also to be understood that the simple locking activity of the ring members 13 is not only positive and effective but is capable of being readily released in the event that it is desired to disassociate a tube from a coupling or fitting according to this invention. This is due primarily to the fact that the ring members 13 are resilient or spring like and are not permanently deformed beyond a specified limit due to the abutting engagement of their normally separated ends 52, 52 when the same are fully contracted, as illustrated in FIGURE 4 of the drawings. Thus when the nut members 12 are unthreaded from the body member 11, the locking rings 13 readily spring radially outwardly in response to axial disassociation of the nut member and body member and decompression of the seal member 14, thereby releasing the pipe and permitting its axial withdrawal as desired.

From the foregoing it is believed that those familiar with this art will readily recognize and appreciate the improved advancement of the present combination of elements over previous efforts and devices in this area. The simplicity and effectiveness of the improved combination of elements as hereindescribed and set forth achieves not only simplicity and directness of operation for the user, but also provides a combination to the manufacture which is easily manufactured and produced with a minimum number of operations and which can be easily assembled, thus leading to economies of production. It is also of importance that the formation of each of the nuts and particularly the cylindrical counterbore surface 41 thereof and its relationship to the cylindrical portion 20 of the fitting body 11 is such as to protect the elastic seal members from damage by the threads 43 of the nut. Likewise the interruption of the threads 25 on the body member so as to displace the same axially away from the end wall 28 of each of the end portions 20 thereof fully protects the elastic seal from being cut and damaged by threads 25. As a result when the seal element 14 is compressed in the cylindrical annular chamber formed by and between the nut counterbore, the end wall 28 of the coupling body and the external surface of the tube 15 within the coupling, the seal member is fully protected against cutting, tearing or like damage from the threads of the fitting.

While the present invention has hereinabove been described in association with the particular embodiment thereof found in a coupling for axially interrelating tube or pipe sections, it will be understood and appreciated by those familiar with the art that such preferred embodiment is only illustrative of the concepts of the present invention so that the same is readily adaptable to other types of fittings such as tees, elbows and the like without departing from its spirit and scope. Consequently the present invention is intended to be unlimited by the foregoing except as may appear in the following appended claim.

I claim:

1. A fitting assembly for smooth walled pipes, tubes and the like, comprising: a male member having a generally cylindrical body formed with an internal cylindrical bore extending inwardly of one end thereof for close tolerance reception of a pipe or tube inserted coaxially thereinto and provided with means therealong for limiting such insertion, a stop collar portion formed on the exterior of said body and having a side wall normal to the longitudinal axis of said body and spaced axially from said one end thereof, a male threaded portion formed on the exterior of said body, intermediate said collar portion and said one end thereof and terminating axially away from the latter to provide an unthreaded cylindrical end portion on the exterior of said body; a female member comprising an annular nut formed with a cylindrical counterbore extending inwardly from one inner end thereof having an end wall normal to said axis, the said end wall of said female member opposing said side wall of said male member in assembly and said counterbore having a female threaded portion extending partially along said counterbore with the remainder of the latter providing a smooth walled cylindrical surface for close fitting reception of said unthreaded end portion of said body in assembly, an opening freely receptive of said pipe or tube formed in the other end of said female member in coaxial communication with said counterbore, and a chamfered, frusto-conical, camming surface extending divergently from and between said opening and the bottom of said counterbore; a split, annular resilient metal locking ring mounted adjacent said camming surface and having a normal uncontracted diameter freely receptive of said pipe or tube therethrough; an annular elastomeric compression seal member mounted in close fitting relationship in said counterbore, opposite said smooth walled surface thereof and having a normal internal diameter freely receptive of said pipe or tube therethrough; and projection means formed substantially at the junction of said camming surface with the bottom of said counterbore and extending radially inwardly therefrom sufficiently to retain said ring, when the latter is in its uncontracted condition, in engagement with said camming surface, but insufficiently to prevent the flow of said seal member therepast when the latter is appropriately compressed, whereby threading advancement of said female member along said male threaded portion sufficiently to bring said end wall thereof into engagement with said side wall, effects predetermined compression of said seal member which produces fluid tight sealing engagement thereof with the exterior of a tube or pipe mounted in the assembly and also causes said seal member to cold flow axially only past said projection means to engage and axially drive said locking ring along said camming surface sufficiently to contract said ring into locking engagement with the exterior of said pipe or tube without deforming the latter.

References Cited
UNITED STATES PATENTS 1,473,300 11/1923 Kruger _____ 285—217
2,491,004 12/1949 Graham _____ 285—105

EDWARD C. ALLEN, *Primary Examiner.*

W. SHEDD, *Assistant Examiner.*